United States Patent
Takayama et al.

(10) Patent No.: US 8,102,736 B2
(45) Date of Patent: Jan. 24, 2012

(54) NEAR-FIELD LIGHT GENERATOR COMPRISING WAVEGUIDE WITH INCLINED END SURFACE

(75) Inventors: Seiichi Takayama, Tokyo (JP); Daisuke Miyauchi, Tokyo (JP); Susumu Aoki, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 288 days.

(21) Appl. No.: 12/496,340

(22) Filed: Jul. 1, 2009

(65) Prior Publication Data

US 2011/0002199 A1 Jan. 6, 2011

(51) Int. Cl.
G11B 11/00 (2006.01)
(52) U.S. Cl. ............................ 369/13.33; 369/112.27
(58) Field of Classification Search ............. 369/112.27, 369/13.24, 13.33, 13.14, 13.12, 13.32, 13.13, 369/13.03, 112.09, 112.14; 385/14, 40; 360/245.3, 360/59
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,330,404 B2 | 2/2008 | Peng et al. | |
| 7,454,095 B2 * | 11/2008 | Baehr-Jones et al. | 385/14 |
| 7,821,732 B2 * | 10/2010 | Komura et al. | 360/59 |
| 2005/0249451 A1 | 11/2005 | Baehr-Jones et al. | |
| 2010/0149930 A1 * | 6/2010 | Komura et al. | 369/13.33 |
| 2010/0290323 A1 * | 11/2010 | Isogai et al. | 369/13.24 |
| 2010/0329085 A1 * | 12/2010 | Kawamori et al. | 369/13.24 |

FOREIGN PATENT DOCUMENTS

| | | |
|---|---|---|
| JP | 2001-255254 | 9/2001 |
| JP | 2004-273021 A | 9/2004 |
| JP | 2008-257819 | 10/2008 |

OTHER PUBLICATIONS

Michael Hochberg, et al. "Integrated Plasmon and dielectric waveguides" Optics Express, vol. 12, No. 22, Nov. 2004, pp. 5481-5486.
U.S. Appl. No. 12/260,639, filed Oct. 29, 2008 for Koji Shimazawa, et al.

* cited by examiner

*Primary Examiner* — Ali Neyzari
(74) *Attorney, Agent, or Firm* — Frommer Lawrence & Haug LLP

(57) ABSTRACT

Provided is a near-field light generator capable of avoiding a noise to the generated near-field light. The generator comprises a waveguide and a plasmon antenna comprising a propagation surface or edge, for propagating surface plasmon, extending to a near-field light generating end. A portion of one side surface of the waveguide is opposed to a portion of the propagation surface or edge, so as for the waveguide light to be coupled with the plasmon antenna. And an end surface of the waveguide is inclined in such a way as to become away from the plasmon antenna toward the near-field light generating end side. The light that propagates through the waveguide and is not transformed into surface plasmon is refracted or totally reflected in the inclined end surface, does not come close to the generated near-field light, thus does not become a noise for the generated near-field light.

18 Claims, 8 Drawing Sheets

NEAR-FIELD LIGHT GENERATOR COMPRISING WAVEGUIDE WITH INCLINED END SURFACE

BACKGROUND OF THE INVENTION

1. Field of the Invention

The present invention relates to a near-field light generator for generating near-field light by using light propagating through a waveguide. And the present invention relates to a head used for thermally-assisted magnetic recording in which a magnetic recording medium is irradiated with near-field light, thereby anisotropic magnetic field of the medium is lowered, thus data can be written. Further, the present invention relates to a magnetic recording apparatus provided with the head.

2. Description of the Related Art

As the recording density of a magnetic recording apparatus becomes higher, as represented by a magnetic disk apparatus, further improvement has been required in the performance of a thin-film magnetic head and a magnetic recording medium. Especially, in the magnetic recording medium, it is necessary to decrease the size of magnetic microparticles that constitute the magnetic recording layer of the medium, and to reduce irregularity in the boundary of record bit in order to improve the recording density. However, the decrease in size of the magnetic microparticles raises a problem of degradation in thermal stability of the magnetization due to the decrease in volume.

Recently, as a method for solving the problem of thermal stability, so-called a thermally-assisted magnetic recording technique is proposed. In the technique, a magnetic recording medium formed of a magnetic material with a large magnetic anisotropy energy $K_U$ is used so as to stabilize the magnetization; anisotropic magnetic field of the medium is reduced by applying heat to a portion of the medium, where data is to be written; just after that, writing is performed by applying write field to the heated portion.

A technique is well-known in which the heating of a portion to be written of the medium is performed by irradiating the portion with near-field light. For example, U.S. Pat. No. 6,768,556 and U.S. Pat. No. 6,649,894 disclose a technique in which a metal plate for generating near-field light, so-called a plasmon antenna, is provided on the opposed-to-medium surface, then near-field light is generated by irradiating the opposite side to the opposed-to-medium surface of the plasmon antenna with laser light guided through a waveguide.

One the other hand, the present inventors have devised a near-field light generator in which laser light propagating through a waveguide is coupled with a plasmon antenna in a surface plasmon mode to cause the excited surface plasmon to propagate to the opposed-to-medium surface, thereby providing near-field light, rather than directly applying the laser light to a plasmon antenna. The plasmon antenna in the near-field light generator is hereinafter referred to as a surface plasmon antenna. In the near-field light generator, the temperature of the surface plasmon antenna does not excessively rise because laser light is not directly applied to the surface plasmon antenna. As a result, there can be avoided such a situation in which the end, which reaches the opposed-to-medium surface, of a read head element for reading data signal or servo signal from the magnetic recording medium becomes relatively far apart from the magnetic recording medium due to the thermal expansion of the plasmon antenna, which makes it difficult to properly read the servo signal. In addition, there can also be avoided such a situation in which the light use efficiency of the near-field light generator is degraded because thermal disturbance of free electrons increases in the plasmon antenna. Here, the light use efficiency of a near-field light generator is given by $I_{OUT}/I_{IN}$ ($\times 100$), where $I_{IN}$ is the intensity of laser light incident to the waveguide, and $I_{OUT}$ is the intensity of near-field light emitted from a near-field light generating end of the plasmon antenna after converting the laser light into surface plasmon in the plasmon antenna.

The above-described near-field light generator has a light that has propagated through the waveguide, however is not transformed into surface plasmon, thus is emitted from the end of the waveguide toward the magnetic recording medium. When performing a thermally-assisted magnetic recording, the emitted light must not cause unwanted writing and erasing, thus the write error must be avoided as much as possible. Especially, there must be avoided both situations in which a portion not to be heated of the magnetic recording medium is irradiated and heated with the emitted light just before applying write magnetic field, and in which the emitted light becomes a noise light by overlapping the generated near-field light. Here, it is very important to have a sufficient distance, on the opposed-to-medium surface of the head, between the emission position of the light emitted toward the magnetic recording medium and the generation position of the near-field light, or not to direct the light that has not been transformed into surface plasmon toward the magnetic recording medium.

SUMMARY OF THE INVENTION

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a near-field light generator is provided, which comprises:

a waveguide through which a light for exciting surface plasmon propagates; and a plasmon antenna comprising: a near-field light generating end for emitting near-field light; and a propagation surface or a propagation edge for propagating surface plasmon excited by the light thereon, extending to the near-field light generating end.

In this near-field light generator, a portion of one side surface of the waveguide is opposed to a portion of the propagation surface or the propagation edge of the plasmon antenna with a predetermined distance, so as for the light propagating through the waveguide to be coupled with the plasmon antenna in a surface plasmon mode, and an end surface of the waveguide on the near-field light generating end side is inclined in such a way as to become away from the plasmon antenna as going toward the near-field light generating end side.

In the near-field light generator according to the present invention, the light that propagates through the waveguide and is not transformed into surface plasmon is refracted or totally reflected in the inclined end surface of the waveguide. Therefore, the light does not come close to the near-field light generated from the near-field light generating end. As a result, there can be avoided a situation in which the light becomes a noise for the generated near-field light.

In the above-described near-field light generator according to the present invention, it is preferable that an inclination angle formed by a normal line of the end surface of the waveguide on the near-field light generating end side and a longitudinal axis of the waveguide is equal to or more than a critical angle in a case that the light propagating through the waveguide is totally reflected in the end surface of the waveguide. Further, it is also preferable that the inclination angle is $\tan^{-1}\{(5000-d_W)/T_{WG}\}$ or less, where $T_{WG}$ indicates a thickness of the waveguide, $d_W$ indicates a distance in the longitudinal axis direction between the near-field light generating end and an top edge of the waveguide on the near-field light generating end side, and the unit of $T_{WG}$ and $d_W$ is nanometer.

Further, in the near-field light generator according to the present invention, a light-reflecting layer is preferably provided so as to cover the end surface of the waveguide on the near-field light generating end side. Further, the end surface of the waveguide on the near-field light generating end side is preferably exposed to an atmosphere surrounding the near-field light generator. Furthermore, it is preferable that a portion sandwiched between the portion of one side surface of the waveguide and the portion of the propagation surface or the propagation edge of the plasmon antenna is a buffering portion having a refractive index lower than a refractive index of the waveguide. In the case, the buffering portion is preferably a part of a clad layer formed so as to cover the waveguide.

According to the present invention, a thermally-assisted magnetic recording head is further provided, which comprises:

a magnetic pole for generating write field from its end on an opposed-to-medium surface side;

a waveguide through which a light for exciting surface plasmon propagates; and a plasmon antenna comprising: a near-field light generating end for emitting near-field light, reaching the opposed-to-medium surface; and a propagation surface or a propagation edge for propagating surface plasmon excited by the light thereon, extending to the near-field light generating end.

In this thermally-assisted magnetic recording head, a portion of one side surface of the waveguide is opposed to a portion of the propagation surface or the propagation edge of the plasmon antenna with a predetermined distance, so as for the light propagating through the waveguide to be coupled with the plasmon antenna in a surface plasmon mode, and an end surface of the waveguide on the opposed-to-medium surface side is inclined in such a way as to become away from the plasmon antenna as going toward the opposed-to-medium surface.

In the thermally-assisted magnetic recording head according to the present invention, the light that propagates through the waveguide and is not transformed into surface plasmon is refracted or totally reflected in the inclined end surface of the waveguide. Therefore, the light does not come close to the near-field light generated from the near-field light generating end. As a result, a situation in which the light performs unwanted writing and erasing can be avoided; thus there can be realized a satisfactory thermally-assisted magnetic recording capable of suppressing the occurrence of write error.

In the above-described thermally-assisted magnetic recording head according to the present invention, the waveguide is preferably provided on a side opposite to the magnetic pole in relation to the plasmon antenna. Further, it is preferable that an inclination angle formed by a normal line of the end surface of the waveguide on the opposed-to-medium surface side and a longitudinal axis of the waveguide is equal to or more than a critical angle in a case that the light propagating through the waveguide is totally reflected in the end surface of the waveguide. And it is also preferable that the inclination angle is $\tan^{-1}\{(5000-d_W)/T_{WG}\}$ or less, where $T_{WG}$ indicates a thickness of the waveguide, $d_W$ indicates a distance in the longitudinal axis direction between the opposed-to-medium surface and an top edge of the waveguide closest to the opposed-to-medium surface, and the unit of $T_{WG}$ and $d_W$ is nanometer.

Furthermore, in the thermally-assisted magnetic recording head according to the present invention, a light-reflecting layer is preferably provided so as to cover the end surface of the waveguide on the opposed-to-medium surface side. Further, the end surface of the waveguide on the opposed-to-medium surface side is preferably exposed to an atmosphere surrounding the head. Furthermore, it is preferable that a portion sandwiched between the portion of one side surface of the waveguide and the portion of the propagation surface or the propagation edge of the plasmon antenna is a buffering portion having a refractive index lower than a refractive index of the waveguide. In the case, the buffering portion is preferably a part of an overcoat layer formed so as to cover the waveguide. Further, it is preferable that a light source is provided on a side opposite to the opposed-to-medium surface in the head, and an end surface on a light-receiving side of the waveguide reaching an head end surface on a side opposite to the opposed-to-medium surface and being provided in a position where the end surface on the light-receiving side can receive a light generated from the light source.

According to the present invention, a head gimbal assembly (HGA) is further provided, which comprises the above-described thermally-assisted magnetic recording head and a suspension supporting the thermally-assisted magnetic recording head.

According to the present invention, a magnetic recording apparatus is further provided, which comprises:

at least one HGA described above; at least one magnetic recording medium; and a recording circuit for controlling write operations which the thermally-assisted magnetic recording head performs to the at least one magnetic recording medium, and the recording circuit further comprises a light-emission control circuit for controlling operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements is arbitrary for viewability.

DESCRIPTION OF THE PREFERRED EMBODIMENTS

Figure 1:
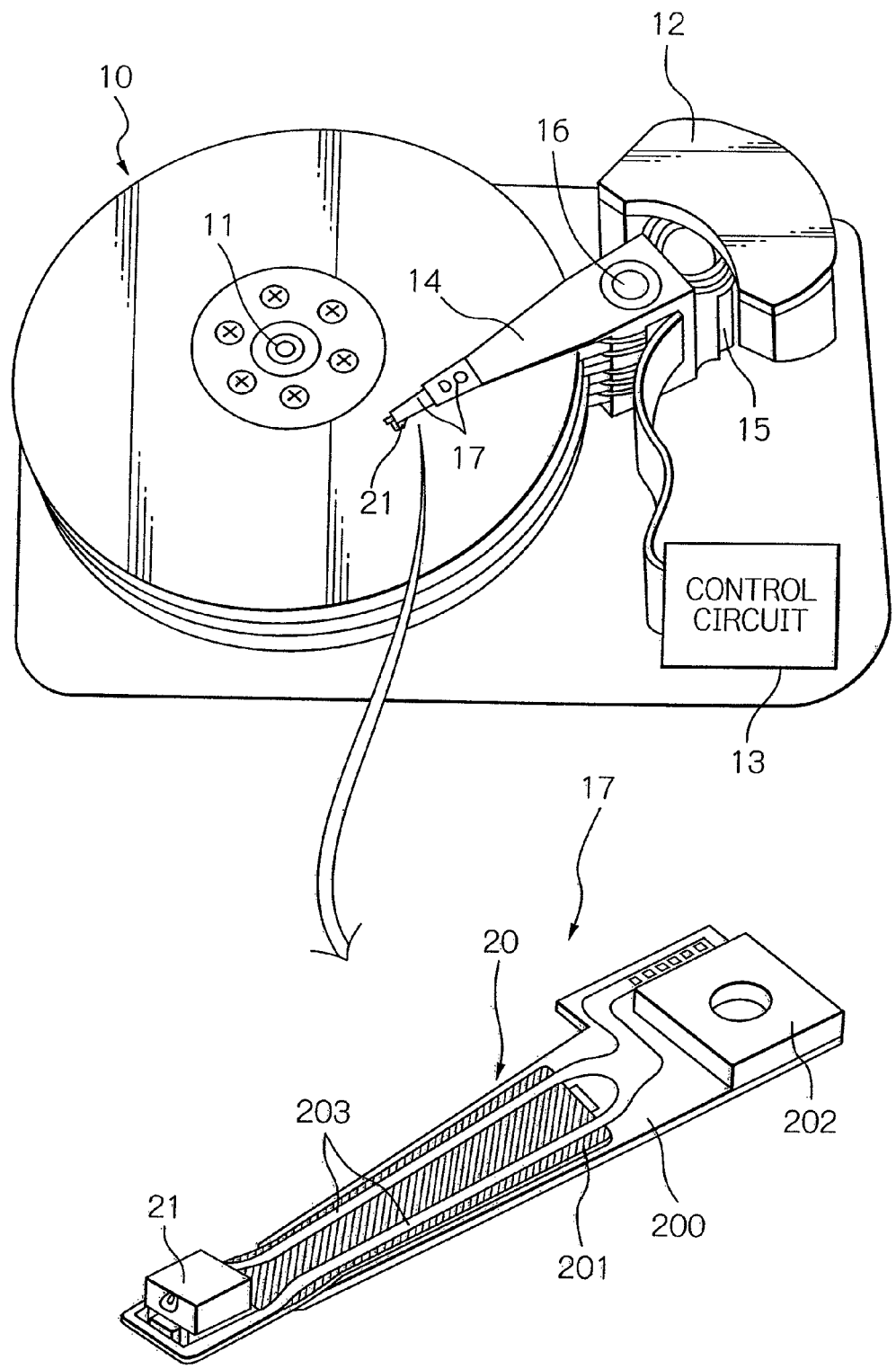
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light for thermally-assisted magnetic recording, which will be described later.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be one.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined spacing (flying height). Moreover, one ends of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
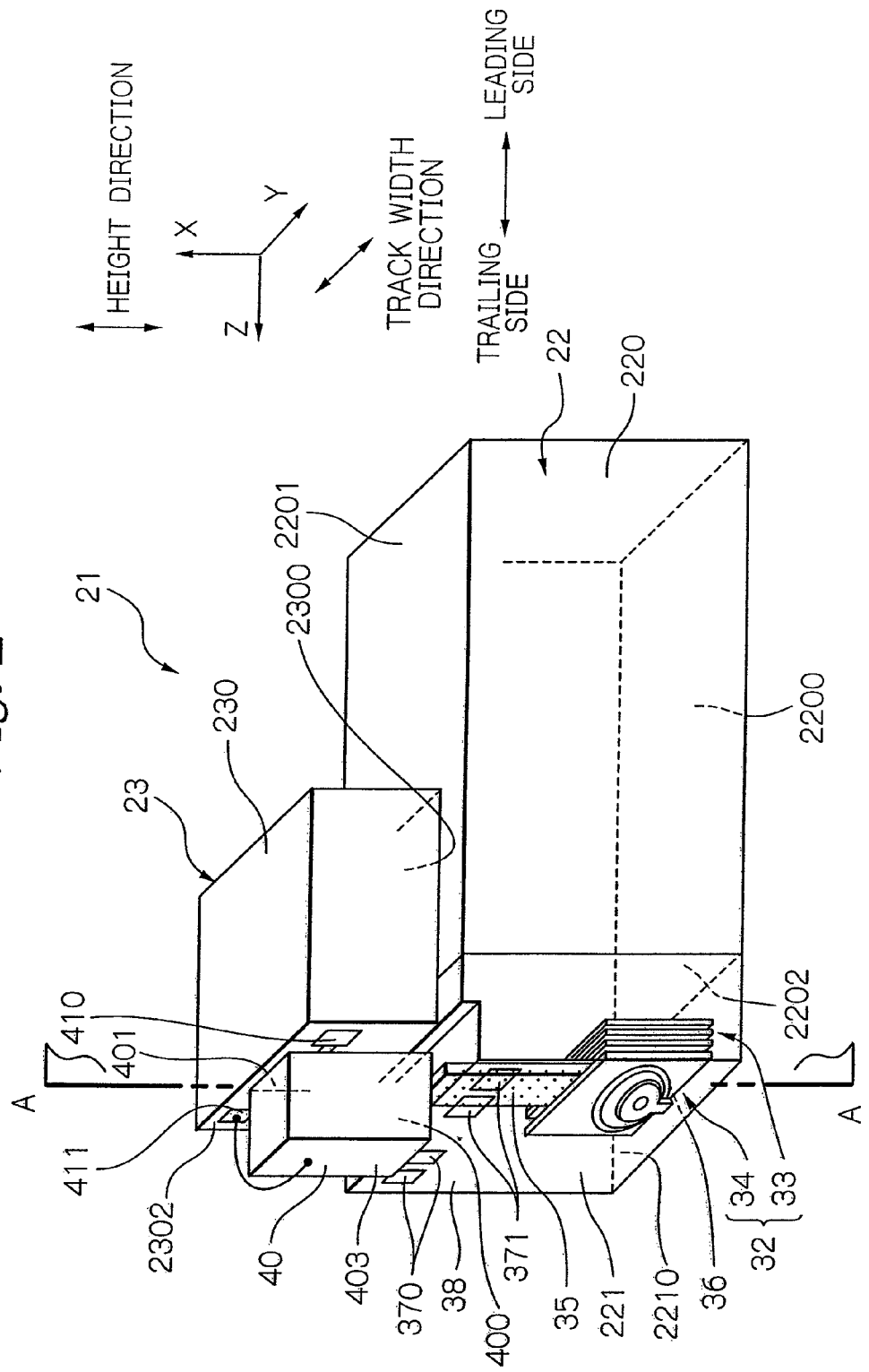
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from a laser diode 40 provided in the light source unit 23 to the opposed-to-medium surface side; a surface plasmon antenna 36 which, together with the waveguide 35, constitutes a near-field light generator; an overcoat layer 38 formed on the element-formation surface 2202 in such a way as to cover the MR element 33, the electromagnetic transducer 34, the waveguide 35, and the surface plasmon antenna 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34, and the surface plasmon antenna 36 reach the head part end surface 2210, which is an opposed-to-medium surface of the head part 221. Here, the head part end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light generated from the laser diode 40 of the light source unit 23 propagates through the waveguide 35. Then, the laser light is coupled with the surface plasmon antenna 36 in a surface plasmon mode, and causes surface plasmon to be excited on the surface plasmon antenna 36, as described in detail later. The surface plasmon propagates on a propagation edge or a propagation surface provided in the surface plasmon antenna 36, which will be detailed later, toward the head part end surface 2210, which causes near-field light to be generated from the end of the surface plasmon antenna 36 on the head part end surface 2210 side. The generated near-field light reaches the surface of the magnetic disk, and heats a portion of the magnetic recording layer of the magnetic disk. As a result, the anisotropic magnetic field (coercive force) of the portion is decreased to a value that enables writing; thus the thermally-assisted magnetic recording can be accomplished by applying write field to the portion with decreased anisotropic magnetic field.

Figure 3:
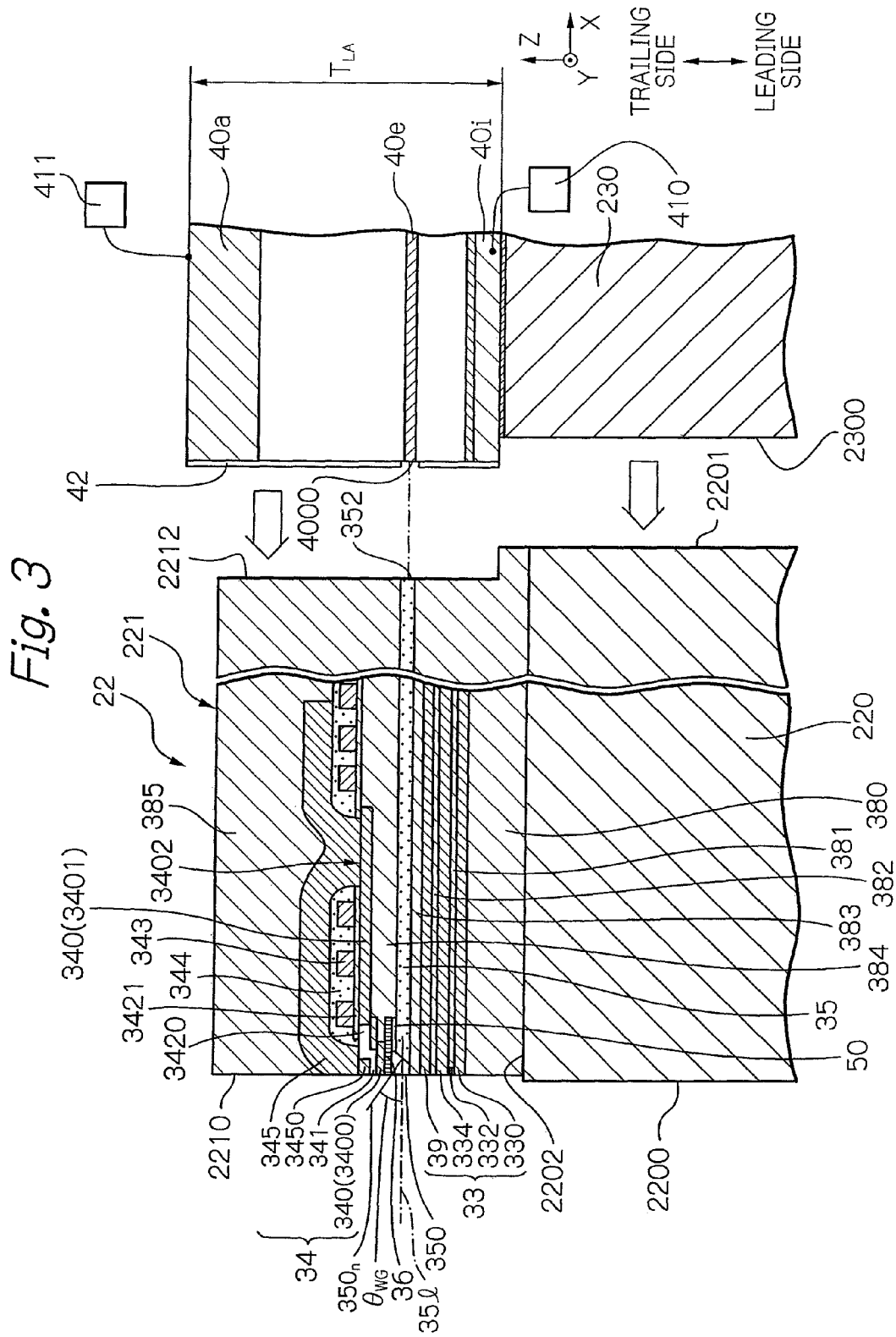
FIG. 3 shows a cross-sectional view taken by plane A in FIG. 2, schematically illustrating a main part of the thermally-assisted magnetic recording head according to the present invention.

FIG. 3 shows a cross-sectional view taken by plane A in FIG. 2, schematically illustrating a main part of the thermally-assisted magnetic recording head 21.

As shown in FIG. 3, the MR element 33 is formed on the insulating layer 380 stacked on the element-formation surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Also as shown in FIG. 3, the electromagnetic transducer 34 is designed for perpendicular magnetic recording in the present embodiment, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic recording layer (perpendicular magnetization layer) of the magnetic disk, the magnetic flux being excited by write current flowing through the write coil layer 343. The main magnetic pole layer 340 has a structure in which a main magnetic pole 3400 and a main pole body 3401 are sequentially stacked. The main magnetic pole 3400 includes: a first main pole portion 3400a (FIG. 4) having a small width $W_P$ (FIG. 5) in the track width direction and reaching the head part end surface 2210; and a second main pole portion 3400b (FIG. 4) located on the first main pole portion 3400a and at the rear (+X side) of the portion 3400a. The small width $W_P$ of the first main pole portion 3400a enables a fine write magnetic field to be generated, so that the track width can be set to be a very small value adequate for higher recording density. The main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μm.

The gap layer 341 forms a gap provided for separating the main magnetic pole layer 340 from the write shield layer 345 in the region near the head part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the distance between the main magnetic pole layer 340 and the write shield layer 345, and is, for example, in the range of approximately 0.01 to 0.5 μm. The write coil layer 343 is formed on a insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 3, and may be, for example, in the range from two to seven.

The write shield layer 345 reaches the head part end surface 2210, and acts as a magnetic path for the magnetic flux returning from a soft-magnetic under layer that is provided under the magnetic recording layer (perpendicular magnetization layer) of the magnetic disk. The thickness of the write shield layer 345 is, for example, approximately 0.5 to 5 μm. Further, the write shield layer 345 has a trailing shield 3450 that is a portion opposed to the main magnetic pole layer 340. The trailing shield 3450 also extends to the head part end surface 2210, and is provided for receiving the magnetic flux spreading from the main magnetic pole layer 340. In the present embodiment, the trailing shield 3450 has a width in the track width direction larger than the width of the main pole body 3401 as well as than the first main pole portion 3400a. This trailing shield 3450 causes the magnetic field gradient between the end portion of the trailing shield 3450 and the first main pole portion 3400a to become steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Referring also to FIG. 3, the waveguide 35 and the surface plasmon antenna 36 are provided between the MR element 33 and the electromagnetic transducer 34, and constitute a near-field light generator as an optical system within the head part 221. Here, the waveguide 35 is arranged in parallel with the element-formation surface 2202, and extends from an rear-end surface 352 that is a part of the head part rear-end surface 2212 to an end surface 350 disposed on the head part end surface 2210 side. And a portion of the upper surface (side surface) of the waveguide 35 and a portion of the lower surface (including a propagation edge 360 (FIG. 4) or a propagation surface) of the surface plasmon antenna 36 are opposed to each other with a predetermined distance. The portion sandwiched therebetween is a buffering portion 50 having a refractive index lower than that of the waveguide 35. The buffering portion 50 acts for coupling the laser light, which propagates through the waveguide 35, with the surface plasmon antenna 36 in a surface plasmon mode. Here, the buffering portion 50 may be a portion of an insulating layer 384 that is a part of the overcoat layer 38, or a new layer provided other than the insulating layer 384.

In the above-described near-field light generator, there is a laser light (waveguide light) that propagates through the waveguide 35 and is not transformed into surface plasmon. During the thermally-assisted magnetic recording, a write error is required to be avoided as much as possible, and thus the waveguide light must not cause unwanted writing and erasing. For that purpose, according to the present invention, the end surface 350 of the waveguide 35 on the head part end surface 2210 side is made to be an inclined surface which is inclined in such a way as to become away from the surface plasmon antenna 36 as going toward the head part end surface 2210 (in −X direction). The normal line 350n of the inclined end surface 350 and the longitudinal axis 351 of the waveguide 35 form a predetermined inclination angle $\theta_{WG}$. Here, the longitudinal axis 351 is an axis that extends along the propagation direction of waveguide light (−X direction) and passes through the intensity center of the spot that the waveguide light forms on the surface 350. As a result, on the head part end surface 2210, the emission position of the waveguide light emitted toward the magnetic disk can be set to be at a sufficient distance from the generating position of near-field light (the position within the end surface 36a). Thereby, there can be avoided unwanted writing and erasing caused by the waveguide light that propagates through the waveguide 35 and is not transformed into surface plasmon, thus a favorable thermally-assisted magnetic recording can be performed, in which write error is sufficiently suppressed. A detailed explanation of the waveguide 35, the surface plasmon antenna 36, and the buffering portion 50 will be given later with reference to FIG. 4.

Further, as is in the present embodiment, an inter-element shield layer 39 is preferably provided between the MR element 33 and the electromagnetic transducer 34 (waveguide 35), sandwiched by the insulating layers 382 and 383. The inter-element shield layer 39 may be formed of soft-magnetic material, and plays a role for shielding the MR element 33 from the magnetic field generated from the electromagnetic transducer 34. Further, a backing coil portion may be provided between the inter-element shield layer 39 and the waveguide 35, though not shown in the figure, in order to suppress wide adjacent track erasure (WATE).

Also according to FIG. 3, the light source unit 23 includes: a unit substrate 230; a laser diode 40 provided on the source-installation surface 2302 of the unit substrate 230; a terminal electrode 410 electrically connected to the lower surface 401 as an electrode of the laser diode 40; and a terminal electrode 411 electrically connected to the upper surface 403 as an electrode of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the laser light propagating through the waveguide 35 to be coupled with the surface plasmon antenna 36 through the buffering portion 50 in a surface plasmon mode.

A light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm to 1.7 μm (micrometer). Specifically, for example, a laser diode of InGaAsP/InP quaternary mixed crystal can also be used, in which possible wavelength region is set to be from 1.2 to 1.67 μm. The laser diode 40 has a multilayered structure including an upper-electrode 40a, an active layer 40e, and a lower-electrode 40i. On the front and rear cleaved surfaces of the multilayered structure of the laser diode 40, respectively formed are reflective layers for exciting the oscillation by total reflection. Further, the reflective layer 42 has an opening in the position of the active layer 40e including the light-emission center 4000. Here, the laser diode 40 has a thickness $T_{LA}$ of, for example, approximately 60 to 200 μm.

Further, an electric source provided within the magnetic disk apparatus can be used for driving the laser diode 40. In fact, the magnetic disk apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the electrodes of the laser diode 40 can be turned upside down, thus the n-electrode 40a may be bonded to the source-installation surface 2302 of the unit substrate 230. Further, alternatively, a laser diode may be provided on the element-formation surface 2202 of the thermally-assisted magnetic recording head 21, and then can be optically connected with the waveguide 35. Furthermore, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 μm; the length (in Z-axis direction) is 850 μm; and the thickness (in X-axis direction) is 230 μm. In the case, the light source unit 23 may be one size smaller than the slider 22, for example, in which the width in the track width direction is 425 μm; the length is 300 μm; and the thickness is 300 μm.

By joining the above-described slider 22 and light source unit 23, constituted is the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined in order that the laser light generated from the laser diode 40 can directly enter the waveguide 35 through the rear-end surface 352 opposite to the ABS 2200 of the waveguide 35.

Figure 4:
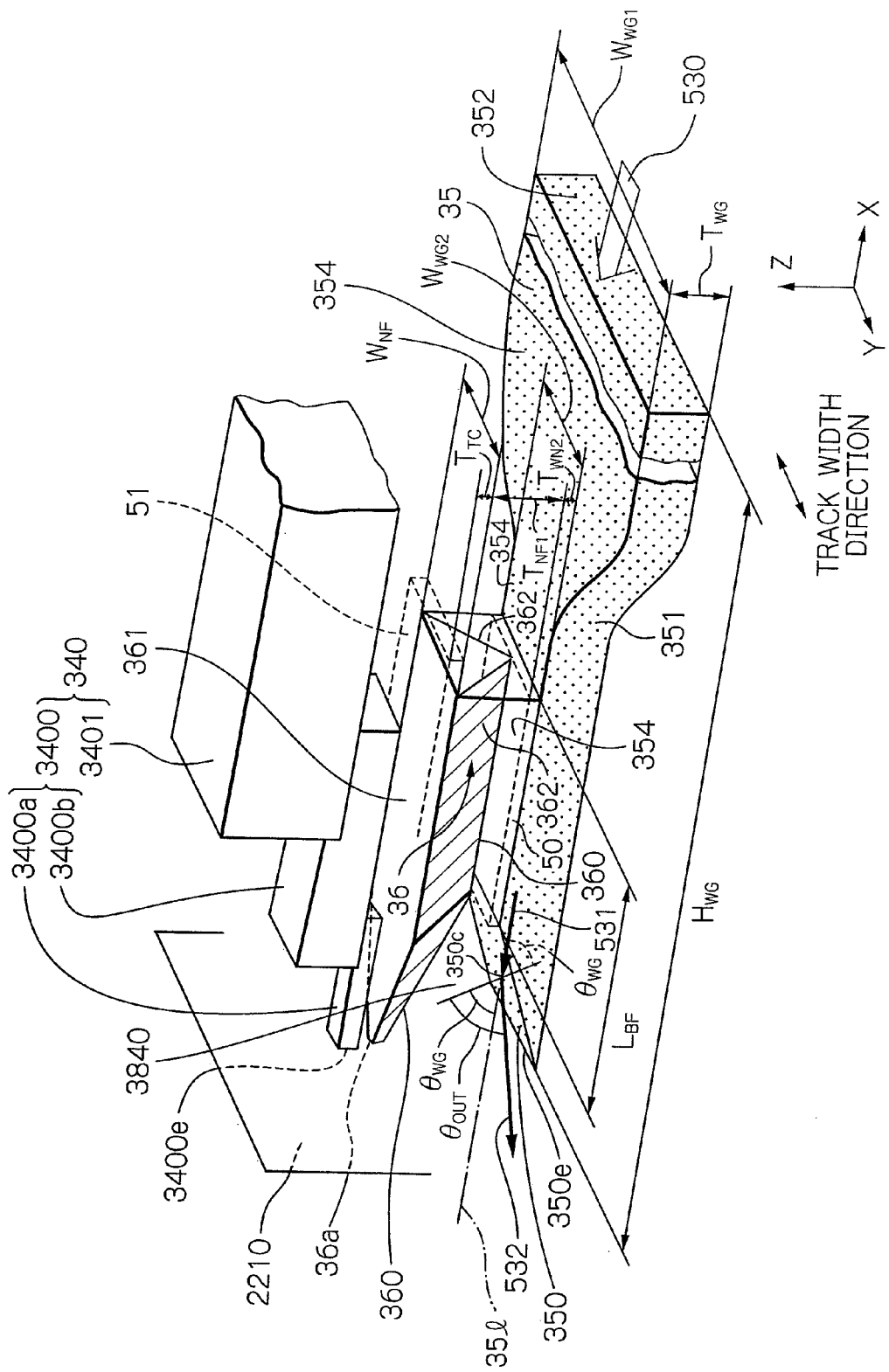
FIG. 4 shows a perspective view schematically illustrating the configuration of the waveguide, the surface plasmon antenna and the main magnetic pole layer according to the present invention.

FIG. 4 shows a perspective view schematically illustrating the configuration of the waveguide 35, the surface plasmon antenna 36 and the main magnetic pole layer 340. In the figure, the head part end surface 2210 is positioned at the left side, the end surface 2210 including positions where write field and near-field light are emitted toward the magnetic recording medium.

Referring to FIG. 4, the configuration includes: the waveguide 35 for propagating laser light 530 used for generating near-field light; and the surface plasmon antenna 36 that has a propagation edge 360 as an edge on which surface plasmon excited by the laser light (waveguide light) 530 propagates. The surface plasmon antenna 36 further has a near-field light generating end surface 36a reaching the head part end surface 2210. Further, a buffering portion 50 is provided as a portion sandwiched between a portion of the side surface 354 of the waveguide 35 and the lower surface 362 including a propagation edge 360 of the surface plasmon antenna 36. That is, the propagation edge 360 is covered with the buffering portion 50. The buffering portion 50 acts for coupling the waveguide light 530 with the surface plasmon antenna 36 in a surface plasmon mode. And the propagation edge 360 plays a role of propagating surface plasmon excited by the waveguide light 530 to the near-field light generating end surface 36a. Here, side surfaces of the waveguide 35 indicate, out of end surfaces surrounding the waveguide 35, end surfaces other than the inclined end surface 350 on the head part end surface 2210 side and the rear-end surface 352 on the opposite side. The side surface serves as a surface on which the propagating waveguide light 530 can be totally reflected in the waveguide 35 that acts as a core. In the present embodiment, the side surface 354 of the waveguide 35, a portion of which is in surface contact with the buffering potion 50, is the upper surface of the waveguide 35. The buffering portion 50 may be a portion of the overcoat layer 38 (FIG. 2) or a new layer provided other than the overcoat layer 38.

Further, the near-field light generating end surface 36a of the surface plasmon antenna 36 is close to an end surface 3400e of the main magnetic pole 3400, the end surface 3400e reaching the head part end surface 2210. Moreover, the propagation edge 360 extends to the near-field light generating end surface 36a. Further, a portion of the propagation edge 360 on the end surface 36a side (end surface 2210 side) has a shape of line or curve extending so as to become closer to the end surface 361 on the side opposite to the propagation edge 360 of the plasmon antenna 36 toward the near-field light generating end surface 36a. The propagation edge 360 can be made rounded to prevent surface plasmon from running off from the edge 360. The curvature radius of the rounded edge may be, for example, in the range of 5 to 500 nm. Further, the surface plasmon antenna 36 may include a propagation surface extending to the near-field light generating end surface 36a instead of the propagation edge 360.

Further, in the present embodiment, the surface plasmon antenna 36 tapers toward the near-field light generating end surface 36a in the height direction (Z-axis direction) near the head part end surface 2210. And the surface plasmon antenna 36 has a cross-section taken by YZ plane with a triangular shape, and especially has a predetermined triangular shape in the vicinity of the head part end surface 2210. As a result, in the present embodiment, the near-field light generating end surface 36a has a triangular shape (FIG. 5) in which one apex is the end of the propagation edge 360 reaching the end surface 36a. Here, surface plasmon propagating on the propagation edge 360 reaches the near-field light generating end surface 36a, and then causes near-field light to be generated from the end surface 36a.

The waveguide 35 and the buffering portion 50 are provided on −Z direction side, that is, on the side opposite to the main magnetic pole 3400 in relation to the surface plasmon antenna 36. As a result, the propagation edge 360 is also positioned on the side opposite to the main magnetic pole 3400 in the surface plasmon antenna 36. With such a configuration, even when a distance between the end surface 3400e for generating write field of the main magnetic pole 3400 and the near-field light generating end surface 36a for emitting near-field light is sufficiently small, preferably 100 nm or less, the waveguide 35 can be sufficiently separated apart from the main magnetic pole 3400 and the main pole body 3401. As a result, there can be avoided such a situation in which a part of the waveguide light 530 is absorbed into the main magnetic pole 3400 or main pole body 3401 made of metal and the amount of light to be converted into the near-field light is reduced.

The waveguide 35 may have a shape with a constant width in the track width direction (Y-axis direction), or as shown in FIG. 4, may have a portion on the head part end surface 2210 side, which has a narrower width in the track width direction (Y-axis direction). The width $W_{WG1}$ in the track width direction (Y-axis direction) of a portion of the waveguide 35 on the side of the rear-end surface 352 opposite to the head part end surface 2210 may be, for example, in the range approximately from 0.5 to 200 μm. The width $W_{WG2}$ in the track width direction (Y-axis direction) of a portion of the waveguide 35 on the end surface 350 side may be, for example, in the range approximately from 0.3 to 100 μm. And the thickness $T_{WG}$ (in Z-axis direction) of a portion on the rear-end surface 352 side may be, for example, in the range approximately from 0.1 to 4 μm, and the height (length) $H_{WG}$ (in X-axis direction) may be, for example, in the range approximately from 10 to 300 μm.

Further, the side surfaces of the waveguide 35: the upper surface 354; the lower surface 353; and both the side surfaces 351 in the track width direction (Y-axis direction) have a contact with the overcoat layer 38 (FIG. 2), that is, the insulating layers 383 and 384, except the portion having a surface contact with the buffering portion 50. Here, the waveguide 35 is formed of a material with refractive index $n_{WG}$ higher than refractive index $n_{OC}$ of the constituent material of the overcoat layer 38, made by using, for example, a sputtering method. For example, in the case that the wavelength $\lambda_L$ of laser light is 600 nm and the overcoat layer 38 is formed of $SiO_2$ (n=1.5), the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_xN_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 enables the propagation loss of waveguide light 53 to be reduced due to the excellent optical characteristics of the constituent material. Further, the waveguide 35 can provide the total reflection in all the side surfaces due to the existence of the overcoat layer 38 as a clad. As a result, more amount of waveguide light 53 can reach the position of the buffering portion 50, which improves the propagation efficiency of the waveguide 35.

In the present embodiment, the inclined end surface 350 of the waveguide 35 on the head part end surface 2210 side is also covered with the constituent material of the overcoat layer 38 having refractive index $n_{OC}$, for example, with a portion 3840 of the insulating layer 384. Therefore, the end surface 350 acts as an interface from the environment of refractive index $n_{WG}$ to the environment of smaller refractive index $n_{OC}$ for a waveguide light 531 that has reached the end surface 350.

Further, alternatively, the waveguide 35 may have a multi-layered structure of dielectric materials in which the upper a layer is in the multilayered structure, the higher becomes the refractive index n of the layer. The multilayered structure can be realized, for example, by sequentially stacking dielectric materials of $SiO_XN_Y$ with the composition ratios X and Y appropriately changed. The number of stacked layers may be, for example, in the range from 8 to 12. In the case that laser light 530 has a linear polarization in Z-axis direction, the above-described structure enables the laser light 530 to propagate in the position closer to the buffering portion 50. In this case, by choosing the composition and layer thickness in each layer, and the number of layers of the multilayered structure, the laser light 530 can propagate in the desired position in Z-axis direction.

The surface plasmon antenna 36 is preferably formed of a conductive material of, for example, metal such as Pd, Pt, Rh, Ir, Ru, Au, Ag, Cu or Al, or an alloy made of at least two of these elements. Further, the surface plasmon antenna 36 can have a width $W_{NF}$ in the track width direction (Y-axis direction) sufficiently smaller than the wavelength of the laser light 530, for example, of approximately 10 to 100 nm. And the surface plasmon antenna 36 can have a thickness $T_{NF1}$ (in Z-axis direction) sufficiently smaller than the wavelength of the laser light 530, for example, of approximately 10 to 100 nm. Further, the length (height) $H_{NF}$ (in X-axis direction) can be set to be, for example, in the range of, approximately 0.8 to 6.0 μm.

The buffering portion 50 is formed of a dielectric material having refractive index $n_{BF}$ lower than the refractive index $n_{WG}$ of the waveguide 35. For example, when the wavelength $\lambda_L$ of laser light is 600 nm and the waveguide 35 is formed of $Al_2O_3$ (n=1.63), the buffering portion 50 may be formed of $SiO_2$ (n=1.46). Further, when the waveguide 35 is formed of $Ta_2O_5$ (n=2.16), the buffering portion 50 may be formed of $SiO_2$ (n=1.46) or $Al_2O_3$ (n=1.63). In these cases, the buffering portion 50 can be a portion of the overcoat layer 38 (FIG. 2) that is made of $SiO_2$ (n=1.46) or $Al_2O_3$ (n=1.63) and serves as a clad. Further, the length $L_{BF}$ (in X-axis direction) of a portion of the buffering portion 50, the portion being sandwiched between the side surface 354 of the waveguide 35 and the propagation edge 360, is preferably in the range of 0.5 to 5 μm, and preferably larger than the wavelength $\lambda_L$ of the laser light 530. In this preferable case, the sandwiched portion has an area markedly larger than a so-called "focal region" in the case that, for example, laser light is converged on a buffering portion 50 and a surface plasmon antenna 36 and coupled in a surface plasmon mode. As a result, very stable coupling in the surface plasmon mode can be achieved.

In the above-described near-field light generator, there is a laser light 532 that propagates through the waveguide 35 and is not transformed into surface plasmon, then is emitted from the end surface 350 of the waveguide 35 toward the magnetic disk. During a thermally-assisted magnetic recording, a write error is required to be avoided as much as possible, and thus the waveguide light must not cause unwanted writing and erasing. Especially, there must be avoided a situation in which, just before applying write field, a portion not to be heated of the magnetic recording layer of the magnetic disk is irradiated and heated with the laser light 532, or in which the laser light 532 becomes a noise light by being overlapped with the near-field light generated from the near-field light generating end surface 36a of the plasmon antenna 36.

In the near-field light generator according to the present invention, the end surface 350 of the waveguide 35 on the head part end surface 2210 side is made to be an inclined surface which is inclined in such a way as to become away from the surface plasmon antenna 36 as going toward the head part end surface 2210 side (the end surface 36a side; in −X direction). The normal line 350n of the inclined end surface 350 and the longitudinal axis 351 of the waveguide 35 form a predetermined inclination angle $\theta_{WG}$. The longitudinal axis 351 is an axis that extends along the propagation direction of waveguide light (−X direction) and passes through the intensity center 350c of the spot that the waveguide light 351 forms on the end surface 350. When the waveguide light 531, which has not been transformed into surface plasmon, reaches the inclined end surface 350, the waveguide light 531 is refracted at the end surface 350 and is emitted as a laser light 532. Here, the incident angle of the incident light 531 becomes equal to the inclination angle $\theta_{WG}$, and the refraction angle $\theta_{OUT}$ becomes as follows, according to Snell's law:

$$\theta_{OUT}=\sin^{-1}(n_{WG} \times n_{OC}^{-1} \times \sin \theta_{WG}). \tag{1}$$

The refraction angle $\theta_{OUT}$ is an angle formed between the normal line 350n of the inclined end surface 350 and the propagation direction of the emitted light 532. These angles $\theta_{OUT}$ and $\theta_{WG}$ meet the condition: $\theta_{OUT} > \theta_{WG}$ because refractive indexes $n_{WG}$ and $n_{OC}$ satisfy the condition: $n_{WG} > n_{OC}$ as described above. Therefore, the laser light 532 is emitted obliquely in a direction further away from the near-field light end surface 36a compared with the propagation direction of the waveguide light 531 (the direction of the longitudinal axis 351 of the waveguide 35). As a result, on the head part end surface 2210, the distance between the emission position of the laser light 532 emitted toward the magnetic disk and the generating position of near-field light (the position within the end surface 36a) can be set sufficiently large. This setting prevents unwanted writing and erasing by the waveguide light that propagates through the waveguide 35 and is not transformed into surface plasmon, thus a favorable thermally-assisted magnetic recording can be realized, in which the occurrence of write error is sufficiently suppressed.

Also as shown in FIG. 4, a thermal conduction layer 51 is preferably provided on the head part end surface 2210 side between the surface plasmon antenna 36 and the first main pole portion 3400a. The thermal conduction layer 51 is formed of, for example, an insulating material such as AlN, SiC or DLC, which has a higher thermal conductivity compared with that of the overcoat layer 38 (FIG. 2). The arrangement of such a thermal conduction layer 51 allows a part of the heat generated when the surface plasmon antenna 36 emits near-field light to get away to the main magnetic pole 3400 and the main pole body 3401 through the thermal conduction layer 51. That is, the main magnetic pole 3400 and the main pole body 3401 can be utilized as a heatsink. As a result, excessive temperature rise of the surface plasmon antenna 36 can be suppressed, and there can be avoided unwanted protrusion of the near-field light generating end surface 36a and substantial reduction in the light use efficiency of the surface plasmon antenna 36.

The thickness $T_{TC}$ of the thermal conduction layer 51 is equivalent to a distance $D_{N-P}$ (FIG. 5), on the head part end surface 2210, between the near-field light generating end surface 36a and the end surface 3400e of the main magnetic pole 3400, and is set to be a small value of 100 nm or less. Further, the refractive index $n_{IN}$ of the thermal conduction layer 51 is set equal to or lower than the refractive index $n_{BF}$ of the buffering portion 50 that covers the propagation edge 360 of the surface plasmon antenna 36. That is, the propagation edge 360 of the surface plasmon antenna 36 is covered with a material having a refractive index $n_{BF}$ equal to or higher than the refractive index $n_{IN}$ of a material covering the end surface 361 opposite to the edge 360 of the surface plasmon antenna 36. This allows surface plasmon to propagate stably on the propagation edge 360. It has turned out in practice to preferably satisfy the relation of refractive index $n_{BF} \geq$ refractive index $n_{IN} \times 1.5$.

Also according to FIG. 4, the main magnetic pole layer 340 includes, as described-above, the main magnetic pole 3400 and the main pole body 3401. The main magnetic pole 3400 includes; the first main pole portion 3400a having the end surface 3400e reaching the head part end surface 2210; and the second main pole portion 3400b, the end portion on the head part end surface 2210 side of the portion 3400b being overlapped on a portion, on the side opposite to the end surface 2210, of the first main pole portion 3400a. Further, the end portion on the head part end surface 2210 side of the main pole body 3401 is overlapped on a portion, on the side opposite to the end surface 2210, of the second main pole portion 3400b. Namely, the end portion on the head part end surface 2210 side of the main magnetic pole layer 340 is formed in such a way as to become closer to the near-field light generating end surface 36a of the surface plasmon antenna 36 as going toward the head part end surface 2210. As a result, the end surface 3400e of the main magnetic pole layer 340 can be made sufficiently close to the near-field light generating end surface 36a, under the condition that the main magnetic pole layer 340 is sufficiently separated apart from the waveguide 35.

Figure 5:
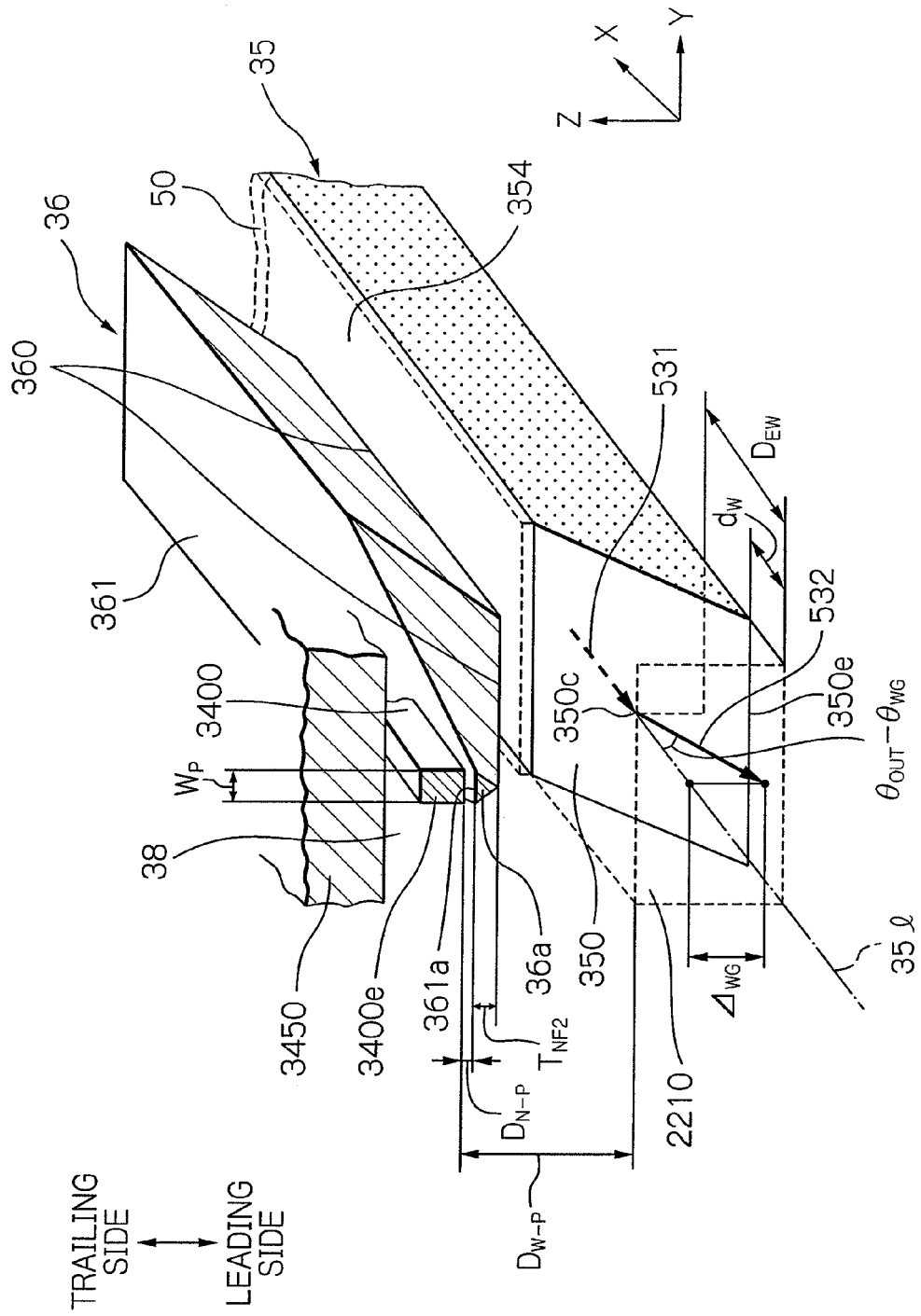
FIG. 5 shows a perspective view illustrating the shapes of the end surfaces of the waveguide, the surface plasmon antenna and the electromagnetic transducer on the head part end surface 2210 or in its neighbor.

FIG. 5 shows a perspective view illustrating the shapes of the end surfaces of the waveguide 35, the surface plasmon antenna 36 and the electromagnetic transducer 34 on the head part end surface 2210 or in its neighbor. The front face of the figure is the head part end surface 2210.

As shown in FIG. 5, the main magnetic pole 3400 (the first main pole portion 3400a) and the write shield layer 345 (the trailing shield 3450) of the electromagnetic transducer 34 reach the head part end surface 2210. The shape of the end surface 3400e of the main magnetic pole 3400 on the head part end surface 2210 is, for example, a rectangle, a square or a trapezoid. Here, the above-described width $W_P$ is a length of the edge extending in the track width direction (Y-axis direction) of the end surface 3400e of the main magnetic pole 3400, and provides the width of a track formed on the magnetic recording layer of the magnetic disk in the case of magnetic-field-dominant recording. The width $W_P$ can be, for example, in the range of approximately 0.05 to 0.5 μm.

Moreover, on the head part end surface 2210, the near-field light generating end surface 36a of the surface plasmon antenna 36 is positioned close to the end surface 3400e of the main magnetic pole 3400 and in the leading side (−Z direction side) of the end surface 3400e. Here, a distance $D_{N-P}$ between the near-field light generating end surface 36a and the end surface 3400e is set to be a sufficiently small value of, for example, 100 nm or less. In the thermally-assisted magnetic recording according to the present invention, the near-field light generating end surface 36a functions as a main heating action part, and the end surface 3400e functions as a writing action part. Therefore, by setting the distance in the above-described way, write field with sufficiently large gradient can be applied to a portion of the magnetic recording layer of the magnetic disk, the portion having been sufficiently heated. This enables a stable thermally-assisted write operation to be securely achieved.

Furthermore, in the present embodiment, the near-field light generating end surface 36a has a shape of isosceles triangle on the head part end surface 2210, having a bottom edge 361a on the trailing side (+Z side) and an apex on the leading side (−Z side) that is an end 360a of the propagation edge 360. The height $T_{NF2}$ of the near-field light generating end surface 36a is preferably 30 nm or less, and more preferably 20 nm or less. By setting the preferable height $T_{NF2}$, the near-field-light emitting position on the end surface 36a can become close to the edge 361a on the trailing side, that is, closer to the end surface 3400e of the main magnetic pole 3400.

Further, by using the configuration according to the present invention as shown in FIG. 4, a distance $D_{W-P}$ between the waveguide 35 and the main magnetic pole 3400 is made sufficiently large while the distance $D_{N-P}$ is set to a minute value as described above. That is, the waveguide 35 can be sufficiently separated apart from the main magnetic pole 3400 and the main pole body 3401. As a result, there can be avoided such a situation in which a part of the laser light is absorbed into the main magnetic pole 3400 or the main pole body 3401 made of metal and the amount of light to be converted into near-field light is reduced.

Referring also to FIG. 5, there is defined as $\Delta_{WG}$ a distance between: the intersection point of the longitudinal axis 351 of the waveguide 35 and the head part end surface 2210; and the intensity center of light spot that the laser light 532 emitted from the inclined end surface 350 forms on the end surface 2210. According to the present invention, providing the inclined end surface 350 in the waveguide 35 enables the laser light 532 proceeding toward the magnetic disk to be more separated away from the near-field light generating end surface 36a by the distance $\Delta_{WG}$. The distance $\Delta_{WG}$ is expressed by the following equation:

$$\Delta_{WG} = D_{EW} \times \tan(\theta_{OUT} - \theta_{WG}). \qquad (2)$$

where angle $\theta_{WG}$ is an incident angle of the waveguide light 351 (an inclination angle of the end surface 350), and angle $\theta_{OUT}$ is a refraction angle of the laser light 532, which is expressed by the above-described equation (1), and $D_{EW}$ is a distance (in X-axis direction) between the intensity center 350c of light spot that the waveguide light 351 forms on the end surface 351 and the head part end surface 2210. The distance $D_{EW}$ is set to be, for example, in the range of 50 to 4000 nm. According to the expressions (1) and (2), it is understood that a sufficiently large value of $\Delta_{WG}$ can be obtained by setting the inclination angle $\theta_{WG}$ of the end surface 350 and the ratio $n_{WG}/n_{OC}$ of refractive indexes to be sufficiently large, and also setting the distance $D_{EW}$ to be sufficiently large.

Figure 6:
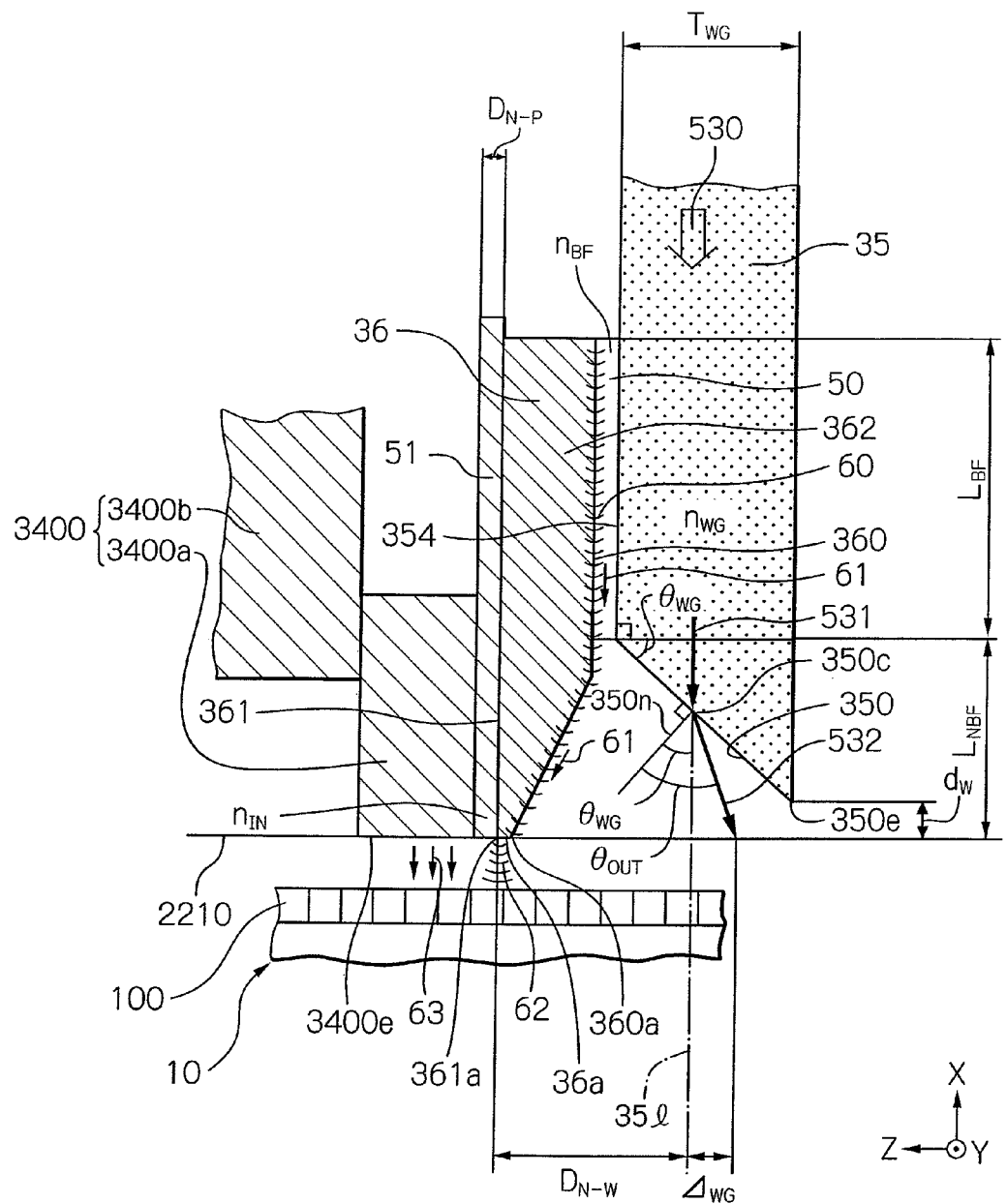
FIG. 6 shows a schematic diagram for explaining the thermally-assisted magnetic recording utilizing a surface plasmon mode according to the present invention.

FIG. 6 shows a schematic diagram for explaining the thermally-assisted magnetic recording utilizing a surface plasmon mode according to the present invention.

Referring to FIG. 6, when the electromagnetic transducer 34 writes data onto the magnetic recording layer of the magnetic disk 10, first, laser light 530 emitted from the laser diode 40 of the light source unit 23 propagates through the waveguide 35. Next, the laser light (waveguide light) 530, which has advanced to near the buffering portion 50, couples with the optical configuration including the waveguide 35 with a refractive index $n_{WG}$, the buffering portion 50 with a refractive index $n_{BF}$ and the surface plasmon antenna 36 made of a conductive material such as metal, and induces a surface plasmon mode on the propagation edge 360 of the surface plasmon antenna 36. That is, the waveguide light couples with the surface plasmon antenna 36 in the surface plasmon mode. This surface plasmon mode can be induced by setting the refractive index $n_{BF}$ of the buffering portion 50 to be lower than the refractive index $n_{WG}$ of the waveguide 35 ($n_{BF} < n_{WG}$).

Actually, evanescent light is excited within the buffering portion 50 based on an optical boundary condition between the waveguide 35 as a core and the buffering portion 50. Then, the evanescent light couples with the fluctuation of electric charge excited on the metal surface (propagation edge 360) of the surface plasmon antenna 36, and induces the surface plasmon mode, and thus surface plasmon is excited. To be exact, there excited is surface plasmon polariton in this system because surface plasmon as an elementary excitation is coupled with an electromagnetic wave. However, the surface plasmon polariton will be hereinafter referred to as surface plasmon for short.

The propagation edge 360 is located closest to the waveguide 35 on the inclined lower surface 362 of the surface plasmon antenna 36, and is just an edge where electric field tends to converge and thus surface plasmon can easily be excited. However, the surface plasmon antenna may alternatively have a propagation surface on which surface plasmon is excited and propagates.

In the induced surface plasmon mode, surface plasmon 60 is excited on the propagation edge 360 of the plasmon antenna 36, and propagates in the direction shown by arrows 61 on the edge 360. The propagation of the surface plasmon 60 can occur under the condition that the propagation edge 360 is covered with the buffering portion 50 having a refractive index $n_{BF}$ equal to or higher than a refractive index $n_{IN}$ of the material covering the end surface 361 of the surface plasmon antenna 36 on the side opposite to the edge 360. It has turned out in practice to preferably satisfy the relation of refractive index $n_{BF}$=refractive index $n_{IN} \times 1.5$.

By the above-described propagation of the surface plasmon 60, the surface plasmon 60, namely, electric field converges on the near-field light generating end surface 36a that reaches the head part end surface 2210 and includes the apex 360a that is the destination of the propagation edge 360. As a result, near-field light 62 is emitted from the near-field light generating end surface 36a. The near-field light 62 is emitted toward the magnetic recording layer 100 of the magnetic disk 10, and reaches the surface of the magnetic disk 10 to heat a portion of the magnetic recording layer of the magnetic disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, a thermally-assisted magnetic recording can be achieved.

Whereas, in a conventional case in which a plasmon antenna provided on the end surface of a head is directly irradiated with laser light propagating through a waveguide, most of the irradiating laser light has been converted into thermal energy within the plasmon antenna. In this case, the size of the plasmon antenna has been set smaller than the wavelength of the laser light, and its volume is very small. Therefore, the plasmon antenna has been brought to a very high temperature, for example, 500° C. (degrees Celsius) due to the thermal energy. On the contrary, in the thermally-assisted magnetic recording according to the present invention, the surface plasmon mode is used, and the near-field light 62 is generated by propagating the surface plasmon 60 toward the head part end surface 2210. This brings the temperature at the near-field light generating end surface 36a to, for example, about 100° C. during the emission of near-field light, which is greatly reduced compared to the conventional. As a result, this reduction of temperature allows the protrusion of the near-field light generating end surface 36a toward the magnetic disk 10 to be suppressed; thereby favorable thermally-assisted magnetic recording can be achieved.

Furthermore, the length $L_{BF}$ of the whole buffering portion 50, that is, of the portion through which the waveguide 35 and the surface plasmon antenna 36 are coupled with each other in a surface plasmon mode, is preferably larger than the wavelength $\lambda_L$ of the laser light 530. In this preferable case, the coupled portion has an area markedly larger than a so-called "focal region" in the case that, for example, laser light is converged on a buffering portion 50 and a surface plasmon antenna 36 and is coupled in a surface plasmon mode. Therefore, the configuration quite different from the system including such "focal region" can be realized in the present invention; and thus, very stable coupling in the surface plasmon mode can be achieved. The induction of surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), US patent Publication No. 2005/0249451 A1, and U.S. Pat. No. 7,330,404 B2.

Also according to FIG. 6, the end surface 350 is an inclined surface that is inclined in such a way as to become more apart from the plasmon antenna 36 when going toward the head part end surface 2210 side (near-field light generating end surface 36a side). Here, the waveguide light 531, a part of laser light 530 which has not been transformed into surface plasmon, is refracted at the inclined end surface 350, and is emitted as a laser light 532 from the end surface 350 toward the magnetic disk 10. Here, there is defined as $D_{N-W}$ a distance between: the intersection point of the longitudinal axis 351 of the waveguide 35 and the head part end surface 2210; and the near-field light generating end surface 36a. The intersection point of the longitudinal axis 351 and the head part end surface 2210 corresponds to an intensity center of light spot in the case that the end surface 350 is perpendicular to the longitudinal axis. According to the present invention, because the end surface 350 is inclined by the inclination angle $\theta_{WG}$, the emitted laser light 532 shows an intensity center at a distance ($D_{N-W}+\Delta_{WG}$) away from the near-field light generating end surface 36a on the head part end surface 2210. Here, the distance $\Delta_{WG}$ can be expressed by the following equation (3), which is formed by combining the equations (1) and (2):

$$\Delta_{WG}=D_{EW} \times \tan\{\sin^{-1}(n_{WG} \times n_{OC}^{-1} \times \sin\theta_{WG})-\theta_{WG}\}. \quad (3)$$

The laser light 532 can be more distant from the near-field light generating end surface 36a by the distance $\Delta_{WG}$. As a result, unwanted writing and erasing are not performed by the waveguide light that propagates through the waveguide 35 and is not transformed into surface plasmon, thus a favorable thermally-assisted magnetic recording can be performed, in which the occurrence of write error is sufficiently suppressed.

Further, as also shown in FIG. 6, when $L_{NBF}$ indicates the length (in X-axis direction) of a portion of the surface plasmon antenna 36 which is not opposed to the waveguide 35 (buffering portion 50), $T_{WG}$ indicates the thickness (in Z-axis direction) of the waveguide 35, and $d_W$ indicates the distance between the top edge 350e of the waveguide 35 which is the closest to the end surface 2210 and the head part end surface 2210, these satisfies the following relation:

$$T_{WG} \times \tan\theta_{WG}=L_{NBF}-d_W. \quad (4)$$

The distance $d_W$ can also be a distance in X-axis direction (in the longitudinal axis 351 direction) between the top edge 350e and the near-field light generating end surface 36a. Here, the length $L_{NBF}$ corresponds to the length of a portion of the surface plasmon antenna 36, on which the excited surface plasmon 60 propagates toward the end surface 2210. Thus, this length $L_{NBF}$ has turned out to be preferably 5000 nm or less in order to suppress the propagation loss of the surface plasmon antenna 60. Therefore, it is preferable that the inclination angle $\theta_{WG}$ is $\tan^{-1}\{(5000-d_W)/T_{WG}\}$ or less, where the unit of $d_W$ and $T_{WG}$ is nanometer. Here, the distance $d_W$ can be set to be in the range of, for example, 0 to 300 nm.

FIGS. 7a to 7e show schematic views illustrating various embodiments regarding the arrangement and shapes of the near-field light generator (the waveguide, the buffering portion and the surface plasmon antenna) and the main magnetic pole according to the present invention.

Figure 7A:
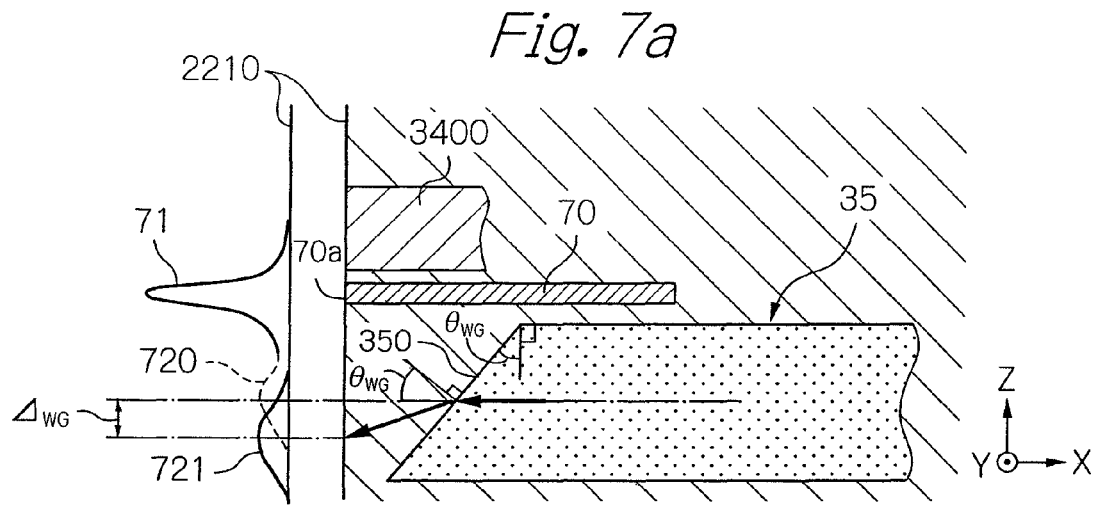
FIGS. 7a to 7e show schematic views illustrating various embodiments regarding the arrangement and shapes of the near-field light generator (the waveguide, the buffering portion and the surface plasmon antenna) and the main magnetic pole according to the present invention.

In the embodiment shown in FIG. 7a, a surface plasmon antenna 70 has a shape of triangle pole, rectangular parallelepiped, or the other whose end reaches the head part end surface 2210, in contrast to the surface plasmon antenna 36 shown in FIG. 4. The surface plasmon antenna 70 can also be coupled with the waveguide light propagating through the waveguide 35 in a surface plasmon mode. The end surface 350 of the waveguide 35 is inclined with an inclination angle $\theta_{WG}$, so that an intensity distribution 721 of the waveguide light emitted from the end surface 350 on the head part end surface 2210 lies more apart from an intensity distribution 71 of near-field light generated from the near-field light generating end surface 70a, compared with an intensity distribution 720 in the case that the end surface 350 is perpendicular ($\theta_{WG}=0°$). Thereby, a situation can be avoided, in which waveguide light that propagates through the waveguide 35 and is not transformed into surface plasmon causes unwanted writing and erasing.

Figure 7B:
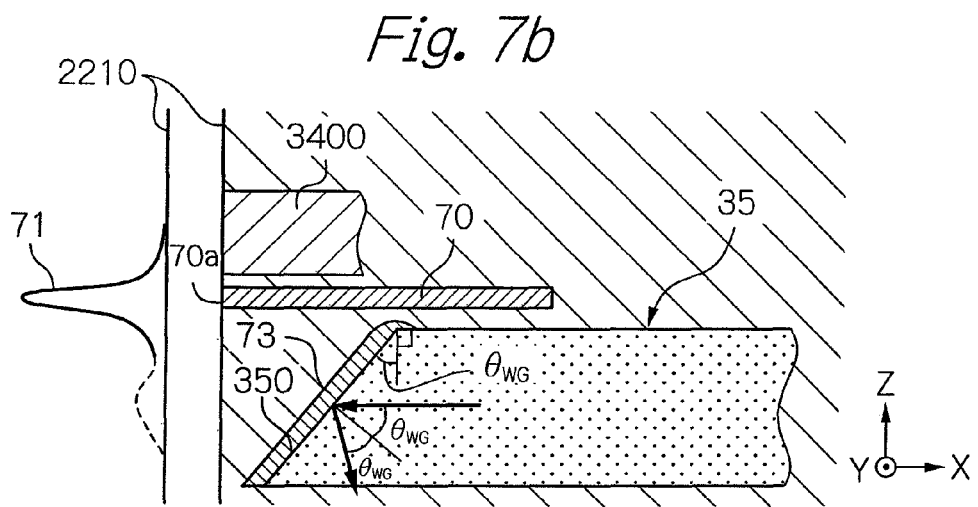

In the embodiment shown in FIG. 7b, the end surface 350 of the waveguide 35 is covered with a light-reflecting layer 73. The light-reflecting layer 73 is formed of a material with small (or zero) transmission and absorption in the wavelength of the waveguide light, for example, a metal such as Au, Al, Ta, or NiFe. The light-reflecting layer 73 thereby reflects the waveguide light that propagates through the waveguide 35 and reaches the end surface 350. As a result, the occurrence of intensity distribution that could be a noise light can be prevented near the intensity distribution 71 of near-field light generated from the near-field light generating end surface 70a. Further, because of the inclined end surface 350, there can also be avoided a situation in which the reflecting light destabilizes the oscillation of laser diode by acting as a return light. The constituent material of the light-reflecting layer 73 is preferably a metal that does not resonate with the wavelength of the applied waveguide light so that near-field light as a noise light is not generated from the light-reflecting layer 73 irradiated with the waveguide light.

Figure 7C:
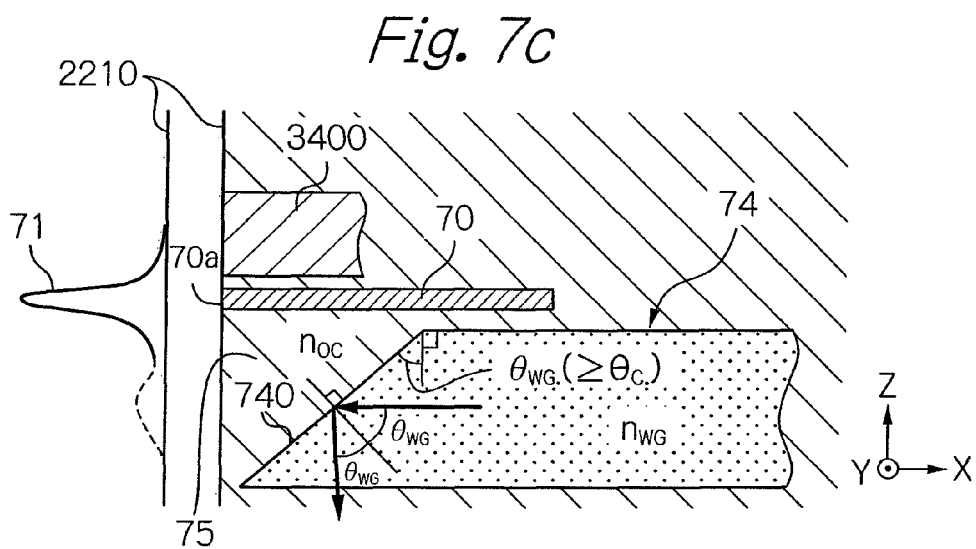

In the embodiment shown in FIG. 7c, the inclination angle $\theta_{WG}$ of the end surface 740 of a waveguide 74 is set to be a critical angle $\theta_C = \sin^{-1}(n_{OC}/n_{WG})$ or more, where the $n_{WG}$ is a refractive index of the waveguide 74 and the $n_{OC}$ ($<n_{WG}$) is a refractive index of an overcoat layer 75 as a clad that covers the waveguide 74 including the end surface 740. In the case, the waveguide light propagating through the waveguide 74 is totally reflected at the end surface 740, thus does not at all proceed toward the vicinity of a portion to be written of the magnetic disk. As a result, the occurrence of intensity distribution that could be a noise light can be prevented near the intensity distribution 71 of near-field light generated from the near-field light generating end surface 70a. Therefore, there can be avoided the occurrence of unwanted writing and erasing by the waveguide light that propagates through the waveguide and is not transformed into surface plasmon. Further, in the present embodiment, the configuration can easily be manufactured relatively because important is just the inclined end surface 740 that meets a total reflection condition, not requiring the other special structure.

Here, considered is the total reflection condition in the end surface 740. In the case, for example, that the refractive index $n_{OC}$ of the overcoat layer 75 as a clad is 1.65 and the refractive index $n_{WG}$ of the waveguide 74 as a core is 2.15, the critical angle $\theta_C$ in the end surface 740 is approximately 50° (deg). Therefore, setting the inclination angle $\theta_{WG}$ of the end surface 740 to be 50° or more enables the total reflection of the waveguide light in the end surface 740.

Figure 7D:
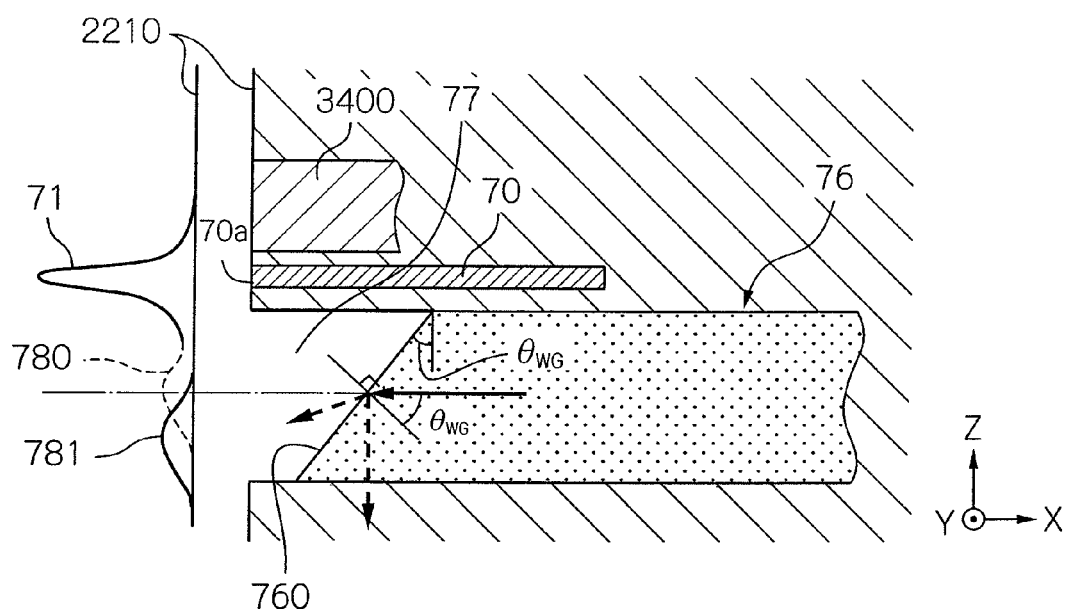

In the embodiment shown in FIG. 7d, the end surface 760 of the waveguide 76 on the head part end surface 2210 side (near-field light generating end surface 70 side) is inclined with an inclination angle $\theta_{WG}$. Further, the end surface 760 is exposed to the atmosphere surrounding the head, for example, air 77. The refractive index n of the air 77 acting as a clad is 1; thus is sufficiently lower than the refractive index $n_{WG}$ of the waveguide 76. As a result, the intensity distribution 781 on the end surface 2210 of the waveguide light emitted from the end surface 760 lies more apart from the intensity distribution 71 of near-field light generated from the near-field light generating end surface 70a, compared with the intensity distribution 780 in the case that the end surface 760 is perpendicular ($\theta_{WG}=0°$). Thereby, a situation can be avoided, in which waveguide light that propagates through the waveguide 76 and is not transformed into surface plasmon performs unwanted writing and erasing.

Furthermore, in the present embodiment, because the refractive index n of the air 77 acting as a clad is 1, it is easy to realize a total reflection in the end surface 760. For example, in the case that the refractive index $n_{WG}$ of the waveguide 76 acting as a core is 1.73, the critical angle $\theta_C$ in the end surface 760 is proximately 35° (deg). Therefore, the inclination angle $\theta_{WG}$ equal to or more than 35° of the end surface 760 leads to the total refection of the waveguide light. That is, a relatively small inclination angle $\theta_{WG}$ enables the total refection of the waveguide light. Moreover, because the ratio of refractive indexes of the core and clad can easily be set to be high, the range of choice for the constituent material of the waveguide can be widened.

Figure 7E:
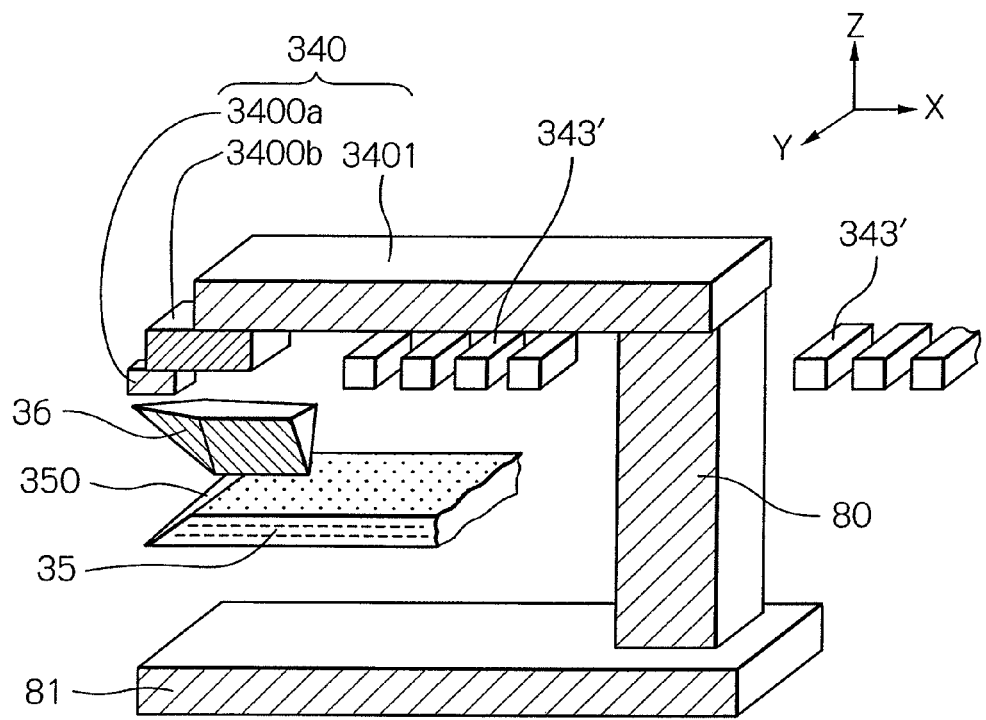

In the embodiment shown in FIG. 7e, the configuration of a waveguide 35 having an end surface 350, a surface plasmon antenna 36 and a main magnetic pole layer 340 is the same as that shown in FIGS. 3 and 4. However, a write shield layer 81, which is a return yoke for receiving a magnetic flux returned from the magnetic disk, is provided on the side opposite to the main magnetic pole layer 340 in relation to the waveguide 35 and surface plasmon antenna 36, that is, on the leading side (in −Z side) from the waveguide 35 and surface plasmon antenna 36. The write shield layer 81 and the main magnetic pole layer 340 are magnetically connected with each other through a back contact portion 80. Further, a write coil layer 343' is formed so as to pass through in one turn at least between the main magnetic pole layer 340 and the write shield layer 81, and has a spiral structure with the back contact portion 80 as a center. Also in this embodiment, by providing the inclined end surface 350, a situation can be avoided, in which waveguide light that propagates through the waveguide 35 and is not transformed into surface plasmon performs unwanted writing and erasing. As a result, a favorable thermally-assisted magnetic recording can be performed by using the surface plasmon antenna.

As described above, it is understood that, according to the present invention, there can be realized a satisfactory thermally-assisted magnetic recording capable of avoiding unwanted writing and erasing by the waveguide light that propagates through the waveguide and is not transformed into surface plasmon, and of suppressing the occurrence of write error. Accordingly, the present invention can contribute to the achievement of higher recording density, for example, exceeding 1 Tbits/in².

Furthermore, according to the present invention, the inclined end surface of the waveguide causes the light emitted from the end surface to be surely directed in a direction away from the surface plasmon antenna. As a result, the directed light does not engage in the heating of the surface plasmon antenna, which contributes to the suppression of excessive temperature rise of the surface plasmon antenna.

All the foregoing embodiments are by way of example of the present invention only and not intended to be limiting, and many widely different alternations and modifications of the present invention may be constructed without departing from the spirit and scope of the present invention. Especially, the near-field light generator utilizing a surface plasmon mode according to the present invention can be applied to optical devices with greatly minute optical paths such as ultra-high-speed light modulation devices. Accordingly, the present invention is limited only as defined in the following claims and equivalents thereto.

The invention claimed is:

1. A near-field light generator comprising:
   a waveguide through which a light for exciting surface plasmon propagates; and
   a plasmon antenna comprising: a near-field light generating end for emitting near-field light; and a propagation surface or a propagation edge for propagating surface plasmon excited by the light thereon, extending to the near-field light generating end,
   a portion of one side surface of the waveguide being opposed to a portion of the propagation surface or the propagation edge of the plasmon antenna with a predetermined distance, so that the light propagating through the waveguide is coupled with the plasmon antenna in a surface plasmon mode, and
   an end surface of the waveguide on the near-field light generating end side being inclined in such a way as to become further from the plasmon antenna as approaching the near-field light generating end side.

2. The near-field light generator as claimed in claim 1, wherein an inclination angle formed by a normal line of the end surface of the waveguide on the near-field light generating end side and a longitudinal axis of the waveguide is equal to or more than a critical angle in a case that the light propagating through the waveguide is totally reflected in the end surface of the waveguide.

3. The near-field light generator as claimed in claim 1, wherein an inclination angle formed by a normal line of the end surface of the waveguide on the near-field light generating end side and a longitudinal axis of the waveguide is $\tan^{-1}\{(5000-d_W)/T_{WG}\}$ or less, where $T_{WG}$ indicates a thickness of the waveguide, $d_W$ indicates a distance in the longitudinal axis direction between the near-field light generating end and an top edge of the waveguide on the near-field light generating end side, and the unit of $T_{WG}$ and $d_W$ is nanometer.

4. The near-field light generator as claimed in claim 1, wherein a light-reflecting layer is provided so as to cover the end surface of the waveguide on the near-field light generating end side.

5. The near-field light generator as claimed in claim 1, wherein the end surface of the waveguide on the near-field light generating end side is exposed to an atmosphere surrounding the near-field light generator.

6. The near-field light generator as claimed in claim 1, wherein a portion sandwiched between the portion of one side surface of the waveguide and the portion of the propagation surface or the propagation edge of the plasmon antenna is a buffering portion having a refractive index lower than a refractive index of the waveguide.

7. The near-field light generator as claimed in claim 6, wherein the buffering portion is a part of a clad layer formed so as to cover the waveguide.

8. A thermally-assisted magnetic recording head comprising:
   a magnetic pole for generating write field from its end on an opposed-to-medium surface side;
   a waveguide through which a light for exciting surface plasmon propagates; and
   a plasmon antenna comprising: a near-field light generating end for emitting near-field light, reaching the opposed-to-medium surface; and a propagation surface or a propagation edge for propagating surface plasmon excited by the light thereon, extending to the near-field light generating end,
   a portion of one side surface of the waveguide being opposed to a portion of the propagation surface or the propagation edge of the plasmon antenna with a predetermined distance, so that the light propagating through the waveguide is coupled with the plasmon antenna in a surface plasmon mode, and
   an end surface of the waveguide on the opposed-to-medium surface side being inclined in such a way as to become further from the plasmon antenna as approaching the opposed-to-medium surface.

9. The thermally-assisted magnetic recording head as claimed in claim 8, wherein the waveguide is provided on a side opposite to the magnetic pole in relation to the plasmon antenna.

10. The thermally-assisted magnetic recording head as claimed in claim 8, wherein an inclination angle formed by a normal line of the end surface of the waveguide on the opposed-to-medium surface side and a longitudinal axis of the waveguide is equal to or more than a critical angle in a case that the light propagating through the waveguide is totally reflected in the end surface of the waveguide.

11. The thermally-assisted magnetic recording head as claimed in claim 8, wherein an inclination angle formed by a normal line of the end surface of the waveguide on the opposed-to-medium surface side and a longitudinal axis of the waveguide is $\tan^{-1}\{(5000-d_W)/T_{WG}\}$ or less, where $T_{WG}$ indicates a thickness of the waveguide, $d_W$ indicates a distance in the longitudinal axis direction between the opposed-to-medium surface and an top edge of the waveguide closest to the opposed-to-medium surface, and the unit of $T_{WG}$ and $d_W$ is nanometer.

12. The thermally-assisted magnetic recording head as claimed in claim 8, wherein a light-reflecting layer is provided so as to cover the end surface of the waveguide on the opposed-to-medium surface side.

13. The thermally-assisted magnetic recording head as claimed in claim 8, wherein the end surface of the waveguide on the opposed-to-medium surface side is exposed to an atmosphere surrounding the head.

14. The thermally-assisted magnetic recording head as claimed in claim 8, wherein a portion sandwiched between the portion of one side surface of the waveguide and the portion of the propagation surface or the propagation edge of the plasmon antenna is a buffering portion having a refractive index lower than a refractive index of the waveguide.

15. The thermally-assisted magnetic recording head as claimed in claim 14, wherein the buffering portion is a part of an overcoat layer formed so as to cover the waveguide.

16. The thermally-assisted magnetic recording head as claimed in claim 8, wherein a light source is provided on a side opposite to the opposed-to-medium surface in the head, and an end surface on a light-receiving side of the waveguide reaching an head end surface on a side opposite to the opposed-to-medium surface and being provided in a position where the end surface on the light-receiving side can receive a light generated from the light source.

17. A head gimbal assembly comprising a thermally-assisted magnetic recording head as claimed in claim 8 and a suspension supporting the thermally-assisted magnetic recording head.

18. A magnetic recording apparatus comprising:
- at least one head gimbal assembly comprising a thermally-assisted magnetic recording head and a suspension supporting the thermally-assisted magnetic recording head;
- at least one magnetic recording medium; and
- a recording circuit for controlling write operations which the thermally-assisted magnetic recording head performs to the at least one magnetic recording medium,
- the thermally-assisted magnetic recording head comprising:
- a magnetic pole for generating write field from its end on an opposed-to-medium surface side;
- a waveguide through which a light for exciting surface plasmon propagates; and
- a plasmon antenna comprising: a near-field light generating end for emitting near-field light, reaching the opposed-to-medium surface; and a propagation surface or a propagation edge for propagating surface plasmon excited by the light thereon, extending to the near-field light generating end,
- a portion of one side surface of the waveguide being opposed to a portion of the propagation surface or the propagation edge of the plasmon antenna with a predetermined distance, so that the light propagating through the waveguide is coupled with the plasmon antenna in a surface plasmon mode,
- an end surface of the waveguide on the opposed-to-medium surface side being inclined in such a way as to become further from the plasmon antenna as approaching the opposed-to-medium surface, and
- the recording circuit further comprising a light-emission control circuit for controlling operations of a light source that generates the light for exciting surface plasmon.

* * * * *